United States Patent
Gordon

(10) Patent No.: US 6,404,217 B1
(45) Date of Patent: *Jun. 11, 2002

(54) ENHANCED SECURITY SEMICONDUCTOR DEVICE, SEMICONDUCTOR CIRCUIT ARRANGEMENT AND METHOD OR PRODUCTION THEREOF

(75) Inventor: Callum Gordon, Strathaven (GB)

(73) Assignee: Atmel Research, Georgetown (KY)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,644

(22) PCT Filed: Sep. 19, 1996

(86) PCT No.: PCT/EP96/04105

§ 371 (c)(1),
(2), (4) Date: Feb. 26, 1998

(87) PCT Pub. No.: WO97/13226

PCT Pub. Date: Apr. 10, 1997

(30) Foreign Application Priority Data

Sep. 30, 1995 (GB) .............................................. 9519996

(51) Int. Cl.⁷ ............................................... G01R 31/26
(52) U.S. Cl. .................... 324/763; 324/765; 324/158.1; 257/48
(58) Field of Search .............................. 324/763, 158.1, 324/765, 760, 754, 73.1; 257/48, 207, 210, 211; 357/40, 45

(56) References Cited

U.S. PATENT DOCUMENTS

| | | | | |
|---|---|---|---|---|
| 4,356,379 A | * | 10/1982 | Graeme | ...................... 219/209 |
| 4,439,727 A | * | 3/1984 | Boyle | .......................... 324/763 |
| 4,446,475 A | * | 5/1984 | Gercekci et al. | ............... 357/40 |
| 5,059,899 A | * | 10/1991 | Farnworth et al. | ......... 324/73.1 |
| 5,446,395 A | * | 8/1995 | Goto | .......................... 324/763 |
| 5,532,614 A | * | 7/1996 | Chiu | .......................... 324/763 |
| 5,539,325 A | * | 7/1996 | Rostoker et al. | ............. 324/763 |
| 5,739,546 A | * | 4/1998 | Saitou et al. | .................. 257/48 |
| 5,981,971 A | * | 11/1999 | Miyakawa | .............. 324/765 X |
| 6,236,224 B1 | * | 5/2001 | Schneider | ................... 324/765 |

FOREIGN PATENT DOCUMENTS

| | | | | |
|---|---|---|---|---|
| WO | 9300513 | 5/1993 | ........... H01L/23/52 |
| WO | 9500097 | 1/1995 | ......... H01L/23/485 |

* cited by examiner

*Primary Examiner*—Ernest Karlsen
*Assistant Examiner*—Minh N. Tang
(74) *Attorney, Agent, or Firm*—Thomas Schneck; John P. McGuire, Jr.

(57) ABSTRACT

A semiconductor circuit arrangement providing enhanced security has a first circuitry portion (12) on a semiconductor wafer (10), a second circuitry portion (16) on the wafer separate from the first circuitry portion, the second circuitry portion being coupled (26) to the first circuitry portion and containing access circuitry for allowing access to thereto, and the second circuitry portion being disposed on the wafer such that it can be destructively removed therefrom to leave the first portion of semiconductor circuitry inaccessible through the second portion of semiconductor circuitry. Isolation circuitry (30) is provided for electrically isolating the first circuitry portion following destructive removal of the second circuitry portion.

14 Claims, 1 Drawing Sheet

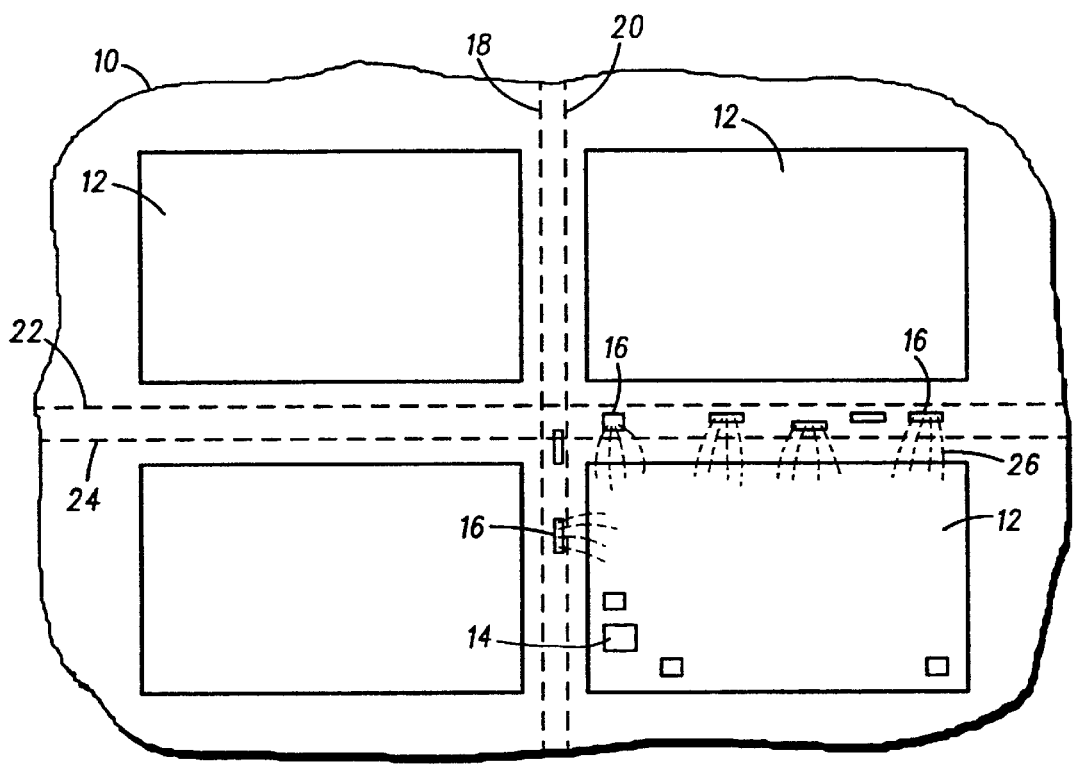
FIG._1
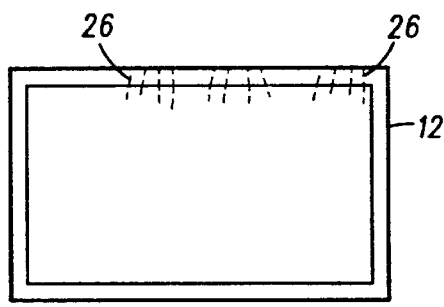
FIG._2
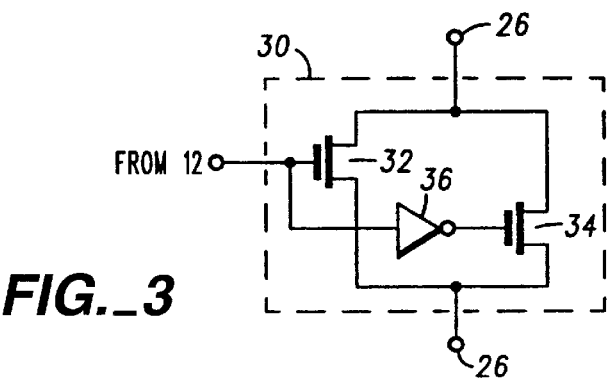
FIG._3

ENHANCED SECURITY SEMICONDUCTOR DEVICE, SEMICONDUCTOR CIRCUIT ARRANGEMENT AND METHOD OR PRODUCTION THEREOF

FIELD OF THE INVENTION

This invention relates generally to semiconductor electronic devices requiring enhanced security.

BACKGROUND OF THE INVENTION

Such electronic devices are commonly used to hold data (such as, for example, financial or personal data) which must be kept secure from unauthorised access or "hacking".

It has been proposed to incorporate electronic circuitry for specific security features into the active die area of a semiconductor electronic device. However, such a proposal suffers from the disadvantage that the incorporated security circuitry would be visible (under microscopic inspection) to a hacker and would therefore be easier for the hacker to reverse engineer. Also, such incorporated security circuitry could limit the testability of the device during production, and so could compromise product quality or require significant effort to design and implement a new test philosophy.

It has also been known to separate physical features, such as bond/probe pads or test circuitry used for testing during production, from the tested device before the device is shipped from the production facility. Typically the device test mode offers general access to device data and features, and so removing access to the test mode increases the security of device data. However, these known separation methods merely disconnect the features, such as bond/probe pads or test circuitry, from the device and leave visible and active the remaining conductors and circuitry. These known separation methods could, therefore, conceivably allow a hacker who could obtain the separated bond/probe pads or test circuitry to reconnect or reverse engineer the necessary circuitry to gain access to the device's test mode.

SUMMARY OF THE INVENTION

It is an object of the present invention to provide a semiconductor circuit arrangement, a semiconductor device and a method of production thereof, in which the above disadvantages are overcome or at least alleviated.

The above object has been achieved by a semiconductor arrangement having a first circuitry portion, consisting of one or more semiconductor dies, disposed on a semiconductor wafer and a second circuitry portion on the wafer separate from the first circuitry portion. The second circuitry portion is coupled to the first circuitry portion and contains access circuitry for allowing access to the first circuitry portion and contains bond pads for allowing exclusive access to the access circuitry. The second circuitry portion is disposed on the wafer such that it can be destructively removed therefrom to leave the first portion of semiconductor circuitry inaccessibe through the second portion of semiconductor circuitry. Isolation circuitry is provided for electrical isolation of the first circuitry portion following the destructive removal of the second circuitry portion.

In accordance with a first aspect of the invention there is provided a semiconductor circuit arrangement as claimed in claim 1.

In accordance with a second aspect of the invention there is provided a semiconductor device as claimed in claim 5.

In accordance with a third aspect of the invention there is provided a method of producing semiconductor circuitry as claimed in claim 8.

BRIEF DESCRIPTION OF THE DRAWINGS

One electronic device and its method of production will now be described, by way of example only, with reference to the accompanying drawings, in which:

FIG. 1 shows a part of a semiconductor wafer containing an array of electronic devices and their associated test circuitry, prior to separation of the individual devices;

FIG. 2 shows an individual electronic device after testing and separation from the wafer of FIG. 1, and ready for shipping; and FIG. 3 is a schematic circuit diagram of isolation circuitry which is employed in the device of FIG. 2 to electrically isolate conductors previously used to connect test circuitry during production and testing.

DETAILED DESCRIPTION OF A PREFERRED EMBODIMENT

Referring firstly to FIG. 1, a semiconductor wafer 10 contains an array of electronic device dies 12 (four of which devices are shown in the part of the wafer illustrated in FIG. 1). The electronic device dies 12 are identical and each contain memory circuitry 14 for holding data which is to be held secure in use of the device in the field. In this preferred embodiment, the devices are microcontrollers and the memory circuitry 14 is provided in the form of read-only memory (ROM), but it will be understood that this invention is more generally applicable to any electronic device in which data is to be held securely.

The wafer is processed using conventional semiconductor fabrication techniques to form the dies 12 thereon. During this fabrication of the dies 12, test circuitry and bond/probe pads, depicted generally at 16 and which will be more fully described hereafter, are formed on the wafer between the dies 12. For reasons which will be explained below, the test circuitry and bond/probe pads 16 are formed within areas bounded by the pairs of dashed lines 18, 20 and 22, 24. The test circuitry and bond/probe pads 16 are connected to their respective device dies 12 by conductors 26.

When fabrication of the wafer 10 is complete, testing of each individual device die 12 is performed by inserting probes to contact the bond/probe pads 16, and applying signals to the probed bond/probe pads in order to activate the device in its test mode and thereby test (in known manner) features of the device, including its memory 14. Such testing is performed in known manner, and need not be described in further detail, except that (as will be explained hereafter) the conductors 26 require enabling voltages to be applied to the test circuitry and bond/probe pads 16 in order for the conductors not to be isolated.

When testing of each individual device 12 has been satisfactorily completed, the wafer is subjected to a first sawing operation: saw cuts are made along and between each of the pairs of dashed lines 18, 20 and 22, 24. In this first sawing operation, a saw blade having a width equal to the space between each of the pairs of dashed lines 18, 20 and 22, 24 is used to cut at a shallow depth sufficient to cut into the surface of the wafer, but not so deep as to cut completely through the wafer. This sawing operation thus destructively removes all the test circuitry and bond/probe pads 16 between the dashed lines 18, 20 and 22, 24.

It will be appreciated that since the test circuitry and bond/probe pads have been removed from their respective device dies at this point no further testing of the device is ordinarily possible. It will be further appreciated that since the test circuitry and bond/probe pads are destroyed in their removal, their visual inspection or reverse engineering is made practically impossible, further enhancing security of the devices against access by a hacker. It will be still further appreciated that the broken, remaining conductors 26 connected to the devices 12 cannot now be used to probe electrical activity or features of the devices since these conductors are now rendered and remain isolated in the absence of the enabling signals from the test circuitry 16 which was present but which has now been destroyed.

Finally, the wafer 10 is subjected to a second sawing operation: saw cuts are made along and between each of the pairs of dashed lines 18, 20 and 22, 24, along channels left by the first sawing operation. In this second sawing operation, a saw blade having a narrower width than in the first sawing operation is used to cut completely through the wafer. This second sawing operation thus completely separates the wafer into individual device dies, such as shown in FIG. 2, which provide enhancing security against unauthorised access.

Referring now to FIG. 3, as mentioned above, isolation circuitry 30 is provided in the device die 12. The circuitry 30 comprises a transmission gate arrangement made up of two field effect transistors (FETs) 32 and 34. The FET 32 is a p-channel device, and the FET 34 is an n-channel device. The FETs 32 and 34 have their source electrodes connected together and also have their drain electrodes connected together. The FETs 32 and 34 are connected with their source and drain electrodes in series in a conductor 26 between the test circuitry 16 and the remainder of the device die 12. The gate electrode of the FET 32 is connected to a conductor from the test circuitry 16; the gate electrode of the FET 34 is coupled, via an inverter 36, to the same conductor from the test circuitry 16.

It will be understood that the circuitry 30 functions as a transmission gate which, when enabled by at its gate electrodes by an enable signal from the test circuitry, allows another signal to pass on the conductor 26 between its source and drain electrodes. In the absence of the enable signal from the test circuitry, the transmission gate circuitry prevents any signal from passing between its source and drain electrodes, and so isolates the associated conductor 26 from the test circuitry.

It will be appreciated that when the test circuitry is destructively removed from the wafer as described above the parts of the conductors 26 remaining on the device die 12 are thus electrically isolated from the remainder of the device die. It will therefore be appreciated that, as already explained above, security of the device against unauthorised access is enhanced since the remaining conductors 26 connected to each separated device 12 cannot now be used to probe electrical activity or features of the device.

As shown in the accompanying drawings, by the dashed lines 26, security of the devices 12 is further enhanced by "burying" (e.g., by implant, or by forming subsequent covering layers) the conductors 26 beneath one or more layers of insulating material such as silicon nitride so as to render more difficult probing of the contacts or their visual inspection in the separated devices 12.

It will be appreciated that as alternatives to the above-described preferred embodiments, laser obliteration, diamond scribe or additional wafer processing steps such as selective chemical etching could be used in place of sawing to destructively remove the test circuitry.

It will further be appreciated that although in the above described embodiment features in the form of test circuitry and bond/probe pads are destructively removed to enhance the security of the finished device, the security of the finished device could be alternatively or additionally enhanced by the destructive removal of other features such as expanded test mode circuitry or circuitry for unscrambling (otherwise scrambled) access to the devices' bus, central processing unit or memory.

What is claimed is:

1. A method for providing enhanced security to a semiconductor circuit arrangement comprising:
    a) providing a semiconductor wafer having a first portion with semiconductor dies and a second portion separate from the first portion having access circuitry for allowing access to the first portion of semiconductor circuitry and a plurality of bond pads terminating the access circuitry and allowing access to the access circuitry;
    b) providing conductors electrically coupling said second portion of said semiconductor wafer to said first portion of said semiconductor wafer;
    c) destroying the access circuitry and bond pads of the second semiconductor portion; and
    d) separating the wafer into individual dies after destroying the access circuitry and bond pads.

2. The method of claim 1 wherein said step of destroying is insufficient to cut completely through the wafer, thus maintaining a wafer structure.

3. The method of claim 1 wherein separating the wafer into individual device dies occurs by sawing completely through the wafer.

4. The method of claim 1 wherein destroying the access circuitry and bond pads is accomplished by sawing partially through said second portion of said semiconductor wafer.

5. The method of claim 1 wherein destroying the access circuitry and bond pads is accomplished by laser obliteration.

6. The method of claim 1 wherein destroying the access circuitry and bond pads is accomplished by selective chemical etching.

7. The method of claim 1 wherein destroying the access circuitry and bond pads is accomplished by a diamond scribe.

8. A method of producing semiconductor circuitry with enhanced security, comprising:
    a) forming a first portion of semiconductor circuitry including of one or more semiconductor dies disposed on a semiconductor wafer;
    b) forming a second portion of semiconductor circuitry disposed on the semiconductor wafer separate from the first portion of semiconductor circuitry, the second portion of semiconductor circuitry being coupled to the first portion of semiconductor circuitry by a plurality of conductors, and containing test circuitry for allowing access to and testing of the first portion of semiconductor circuitry and a plurality of bond pads terminating the test circuitry for allowing exclusive access to the test circuitry; and c) destructively removing the second portion of semiconductor circuitry from the wafer, including the bond pads, to leave the first portion of semiconductor circuitry inaccessible through the second portion of semiconductor circuitry wherein said step of removing occurs pre-dicing of said wafer.

9. The method of producing semiconductor circuitry according to claim 8, wherein the step of destructively removing the second portion of semiconductor circuitry from the wafer comprises performing a first sawing operation on the surface of the wafer at a depth sufficient to destructively removing the second portion of semiconductor circuitry and insufficient to cut through the wafer.

10. The method of producing semiconductor circuitry according to claim 9, further comprising performing a second sawing operation on the wafer at a depth sufficient to cut through the wafer.

11. The method of producing semiconductor circuitry according to claim 8, the semiconductor circuitry further comprising isolating circuitry for electrically isolating the first portion of semiconductor circuitry following removal of the second portion of semiconductor circuitry.

12. The method of producing semiconductor circuitry according to claim 11, wherein the isolating circuitry comprises transmission gate means.

13. The method of producing semiconductor circuitry according to claim 8, further comprising dicing the wafer into individual dies after said step of destructive removal.

14. The method of producing semiconductor circuitry according to claim 8 further comprising burying said plurality of conductors under at least one layer of insulating material to an extent that the conductors are isolated from probing.

* * * * *